United States Patent
Liao

(10) Patent No.: US 6,248,147 B1
(45) Date of Patent: Jun. 19, 2001

(54) AIR FILTER FOR A CEILING FAN

(76) Inventor: Jen-Kuan Liao, 10 F-8, No. 5, Lane 466, Minchuan Rd., Taichung (TW)

(*) Notice: Subject to any disclaimer, the term of this patent is extended or adjusted under 35 U.S.C. 154(b) by 0 days.

(21) Appl. No.: 09/437,364

(22) Filed: Nov. 10, 1999

(51) Int. Cl.[7] .................................................. B01D 35/30
(52) U.S. Cl. ........................... 55/385.1; 55/471; 55/503; 96/417; 416/146 R
(58) Field of Search ............................... 55/385.1, 385.2, 55/467, 471, 473, 503; 96/417; 416/146 R, 5

(56) References Cited

U.S. PATENT DOCUMENTS 5,668,920 * 9/1997 Pelonis .................................. 392/361
5,887,785 * 3/1999 Yilmaz .................................. 237/1 R

FOREIGN PATENT DOCUMENTS 32 45 769 * 8/1983 (DE) .................................... 55/385.2
1-266824 * 10/1989 (JP) ........................................ 55/471

* cited by examiner

Primary Examiner—David A. Simmons
Assistant Examiner—Robert A. Hopkins
(74) Attorney, Agent, or Firm—Dorsey & Whitney LLP

(57) ABSTRACT

The air filter for a ceiling fan in accordance with the present invention is suspended from the switch box of a ceiling fan, and comprises a cover in which a rotating blade and a filter are received. With the air filter for a ceiling fan in accordance with the present invention, the air is drawn through the filtering means by the suction force from the fan blade and then flows out the cover. Since the housing is positioned just under the ceiling fan, the filtered air is then broadly spread to the whole room by the ceiling fan.

9 Claims, 4 Drawing Sheets

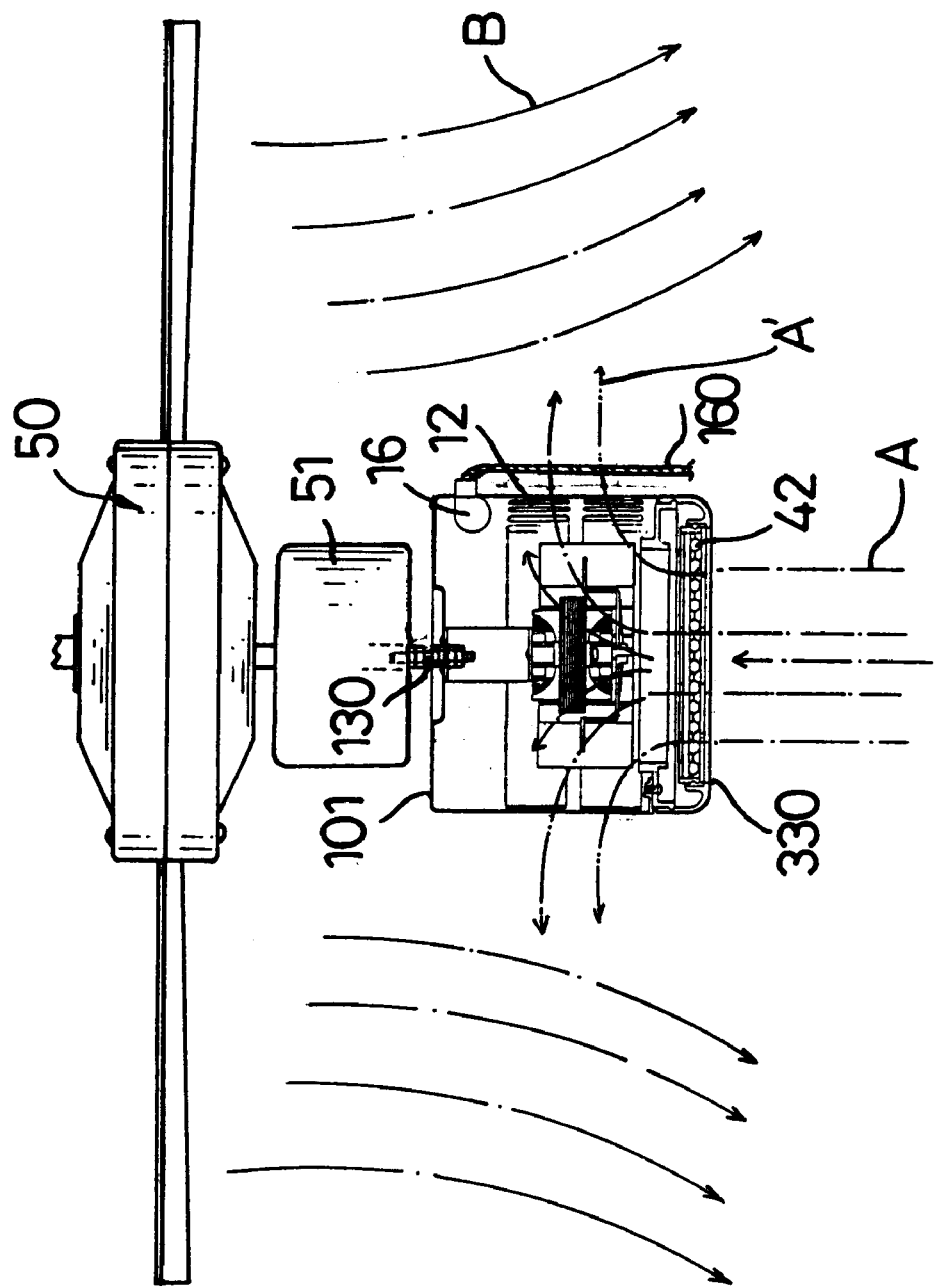

AIR FILTER FOR A CEILING FAN

BACKGROUND OF THE INVENTION

1. Field of the Invention

The present invention relates to an air filter for a ceiling fan, especially to an air filter centrally suspended from a ceiling fan to filter the air and reinforce the circulation of clean air indoors.

2. Description of Related Art

A conventional air filter is usually placed on the floor in a corner indoors. Since the corner is a place where air does not circulate well, the filtering effect provided by the conventional air filter is not as good as desired. In the case of a narrow room such as a metropolitan apartment, the conventional air filter also has a problem of occupying a great deal of floor space.

Therefore, there is a need for an air filter capable of providing an improved filtering effect, reinforcing the circulation of clean air and saving floor space.

SUMMARY OF THE INVENTION

The objective of the present invention is to provide an air filter for a ceiling fan capable of reinforcing the circulation of clean air.

To achieve the objective, the air filter for a ceiling fan in accordance with the present invention is suspended from the switch box of a ceiling fan, and comprises a housing in which a rotating blade and a filtering means are received. With the air filter for a ceiling fan in accordance with the present invention, the air is drawn through the filtering means by the suction force from the blade and then flows out the housing. Since the housing is positioned just under the ceiling fan, the filtered air is then spread to the whole room by the ceiling fan.

Other objectives, advantages and novel features of the invention will become more apparent from the following detailed description when taken in conjunction with the accompanying drawings.

BRIEF DESCRIPTION OF THE DRAWINGS

FIG. 4 is a schematic view in partial section of the air filter for a ceiling fan along line 3—3 in FIG. 1 showing the circulation of the air when using the air filter.

DETAILED DESCRIPTION OF THE PREFERRED EMBODIMENT

Figure 1:
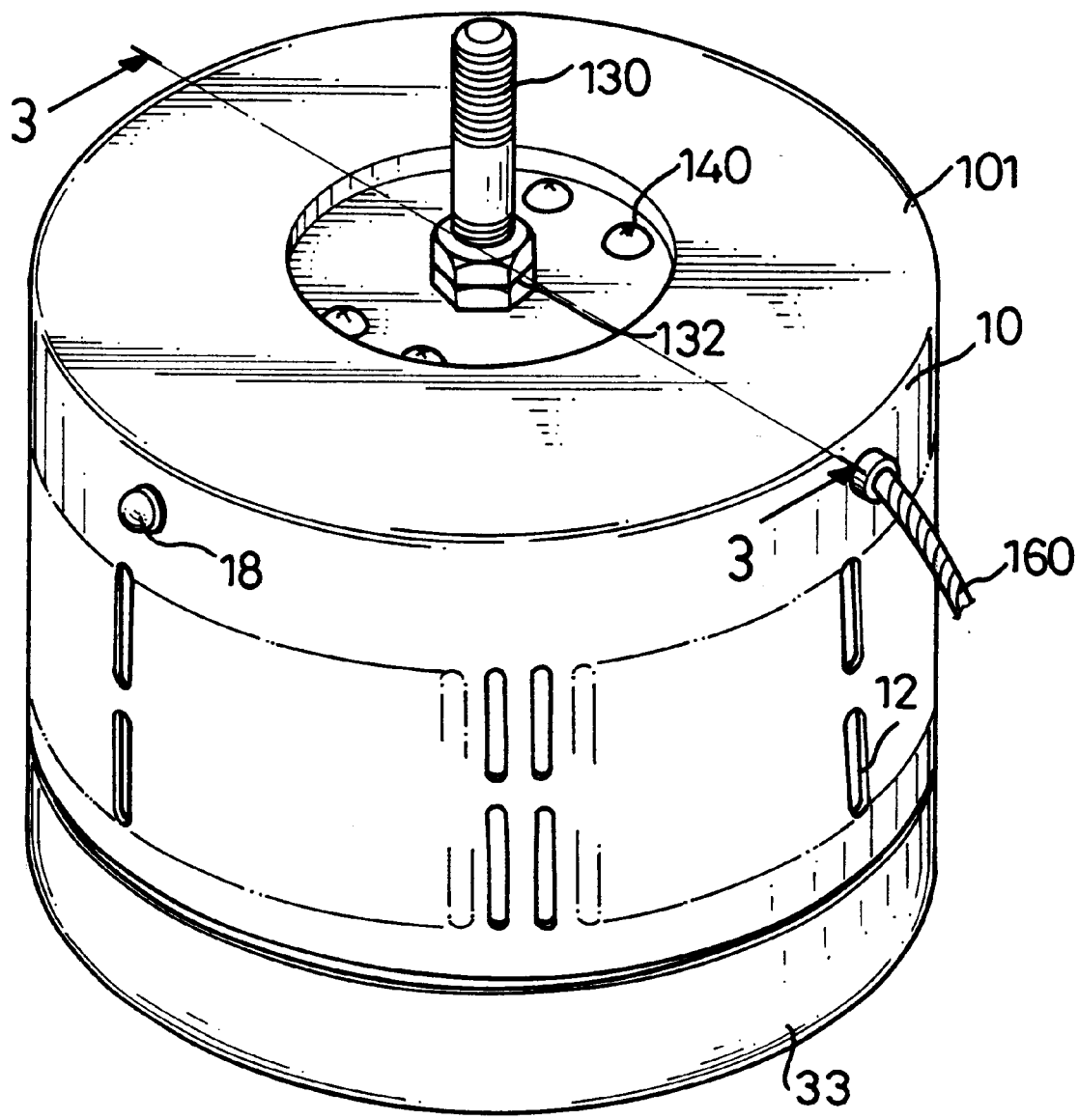
FIG. 1 is a perspective view of the air filter for a ceiling fan in accordance with the present invention.
Figure 2:
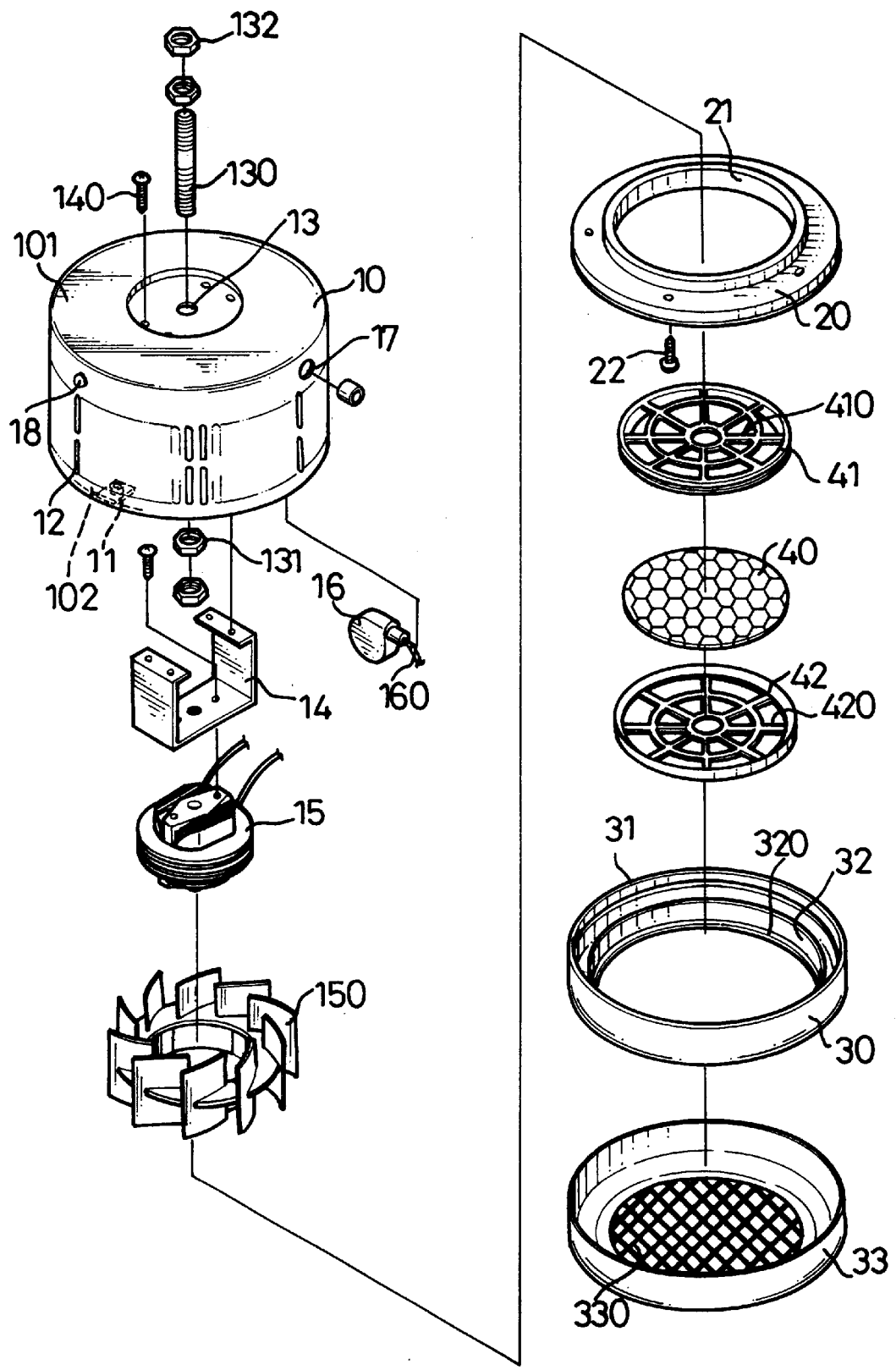
FIG. 2 is an exploded perspective view of the air filter for a ceiling fan in FIG. 1.
Figure 3:
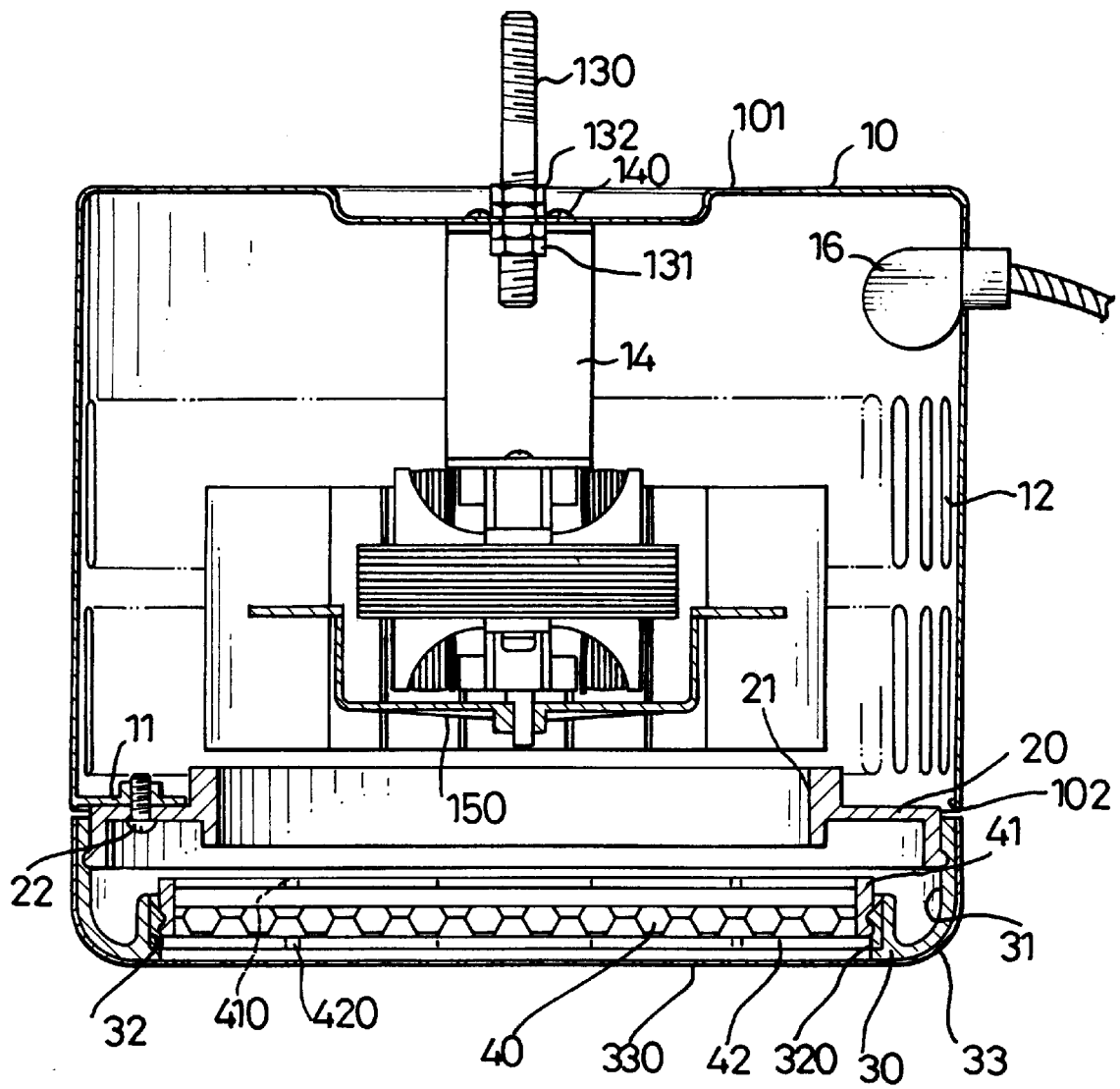
FIG. 3 is a side plain view in partial section of the air filter for a ceiling fan along line 3—3 in FIG. 1.

With reference to FIGS. 1, 2 and 3, the air filter for a ceiling fan in accordance with the present invention comprises a housing, a fan assembly and a filter assembly.

The housing comprises a cover (10) and a base (33). The cover (10) is a hollow cylinder with an enclosed end (101) on the top and an opening (102) formed on the other end.

The enclosed end (101) of the cover (10) has a through hole (13) defined at the center, and a stud (130) is inserted through the through hole (13) of the enclosed end (101). Two nuts (131, 132) are respectively provided inside and outside of the enclosed end (101) of the cover (10) so that the nuts (131, 132) can be screwed on the lower end of the stud (130) to squeeze the enclosed end (101) of the cover (10). The stud (130) in cooperation with the nuts (131, 132) is used to fixedly connect the cover (10) to a ceiling fan (50) (see FIG. 4).

Multiple air outlets (12) are formed on the wall of the cover (10). The cover (10) wallalso has a hole (17) defined near the top. Several locking tabs (11) are integrally formed on the inner periphery of the cover (10) wall at the opening (102) and extend toward the central of the opening (102).

The base(33) presses onto the locking collar (30) in filter assembly to form the bottom of the housing. A large central hole in the base (33) that serves as the inlet (330) for air is covered with wide mouth screen or mesh.

Optionally, an indicator (18) such as a light can be mounted on the cover (10) wall to indicate whether or not the air filter is in operating condition.

The fan assembly comprises a fan blade (150), a motor (15), a switch (16) and a mounting bracket (14). The switch (16) is attached to the hole (17) inside the cover (10) wall. A cord (160) extending from the switch (16) and out of the hole (17) of the cover (10) wall is used to turn the switch (16) on and off. The bracket (14) is suspended from the enclosed end (101) of the cover (101). The bracket (14) is secured by screws (140) that extend through the enclosed end (101) to the inside of the cover (10).

The motor (15) is mounted on the bracket (14) inside the cover (10). The motor (15) is electrically connected with the switch (16) so that the motor (15) can be driven by the electricity from the switch (16). A blade (150) is fixedly mounted on the motor (15) so that the blade (150) rotates when driven by the motor (15).

The filter assembly comprises a mounting assembly and a filter (40) in a frame (410, 420). The mounting assembly comprises an upper bracket (20) with an opening (21) and a locking collar (30). The upper bracket (20) is secured in the housing (10) opening (102) with screws (22) screwed into the locking tabs (11).

The locking collar (30) is mounted on and under the bracket (20) by a lip (31) snapping onto the outer edge of the bracket (20). A flanged shoulder (320) extends into the hole formed in the center of the locking collar (30) to form a seat for the filter assembly.

The filtering assembly comprises a filter (40) encased in an upper frame (41) and a lower frame (42). Both of the frame (41, 42) are formed with an open grid (410, 420) to hold the filter (40) in place and allow air to pass through the filter (40). The filter assembly is detachably received in the locking collar (30) seat (32). Since the locking collar (30) can be easily removed, the filter (40) can be changed or removed and cleaned whenever it is dirty.

With reference to FIG. 3 and FIG. 4, the air filter in accordance with the present invention is centrally secured on the switch box (51) of the ceiling fan (50) by utilizing the stud (130). By pulling the cord (160), the switch (16) turns on the motor (15) so that the blade (150) will rotate. In this case, it is preferable that the switch (16) also turns on and off the ceiling fan (50). When the blade (150) rotates, the air under the inlet (330) will be drawn through the lower frame (420), the filter (40) and the upper frame (410) (as indicated by the dotted line A). The air will be cleaned by the filter (40), and then is blown out of the cover (10) through the outlets (12) (as indicated by the dotted line $A^1$). After leaving the cover (10), the filtered air will be spread by the propelling force exerted from the ceiling fan (50) (as indicated by the dotted line B). Accordingly the filtered air can be broadly spread over the whole room. Consequently, no floor space is needed for the air filter any more.

Although the present invention has been explained relative to its preferred embodiment, it is to be understood that many other possible modifications and variations can be made without departing from the spirit and scope of the invention as hereinafter claimed.

What is claimed is:

1. An air filter for a ceiling fan, comprising:
   a housing centrally suspended from the ceiling fan, said housing having air outlets and an air inlet defined thereon;
   a motor located inside the housing, said motor having a fan blade mounted thereon;
   a base detachably mounted under the air inlet of the housing, said base having an opening aligned with the air inlet of the housing and having a mesh defined thereon; and
   a filter detachably received in the base.

2. The air filter for a ceiling fan as claimed in claim 1, wherein the ceiling fan has a switch box centrally suspended therefrom and a stud is further provided to suspend the housing from the switch box.

3. The air filter for a ceiling fan as claimed in claim 1, wherein the housing is in shape of a hollow cylinder having an enclosed end and a cover extending down from the edge of the enclosed end, said cover (10) having a distal end defining an opening to serve as the air inlet.

4. The air filter for a ceiling fan as claimed in claim 3, wherein a tab or tabs integrally extend(s) from the inner cover at the opening towards the center of the opening, and a bracket is further mounted to the tab(s) to detachably connect an additional locking collar in the base to detachably receive the filter.

5. The air filter for a ceiling fan as claimed in claim 4, wherein two frames are further provided to sandwich the filter and are detachably received in the locking collar together with the filter.

6. The air filter for a ceiling fan as claimed in claim 3, wherein the air outlets are defined on the cover (10).

7. The air filter for a ceiling fan as claimed in claim 3, wherein the cover (10) further has a hole defined thereon and a switch is further received inside the cover at the hole to electrically connect to the motor, said switch having a cord extending out the hole and suspended downwardly.

8. The air filter for a ceiling fan as claimed in claim 3, wherein the cover (10) further has an indicator defined thereon to indicate whether or not the motor is in the operating condition.

9. The air filter for a ceiling fan as claimed in claim 3, wherein a bracket is further mounted inside the cover on the enclosed end to support the motor.

* * * * *